United States Patent [19]

Fearing

[11] E Re. 29,536

[45] Reissued Feb. 14, 1978

[54] MARKING TAG

[76] Inventor: Donald David Fearing, 942 Arbor, Mahtomedi, Minn. 55115

[21] Appl. No.: 768,149

[22] Filed: Feb. 14, 1977

Related U.S. Patent Documents

Reissue of:

[64] Patent No.: 3,934,368
Issued: Jan. 27, 1976
Appl. No.: 472,085
Filed: May 22, 1974

U.S. Applications:

[63] Continuation-in-part of Ser. No. 216,489, Jan. 10, 1972, abandoned.

[51] Int. Cl.[2] ..... G09F 3/04
[52] U.S. Cl. ..... 40/301
[58] Field of Search ..... 40/301, 300; 128/329, 128/330

[56] References Cited

U.S. PATENT DOCUMENTS

| | | | |
|---|---|---|---|
| 3,512,289 | 5/1970 | Hayes | 40/301 |
| 3,526,987 | 9/1970 | McCarty et al. | 40/301 |
| 3,552,051 | 1/1971 | Ritchey | 40/301 |
| 3,694,949 | 10/1972 | Howe | 40/301 |

*Primary Examiner*—John F. Pitrelli
*Attorney, Agent, or Firm*—Jacobson and Johnson

[57] ABSTRACT

An ear tag for identifying animals is provided with a flat body portion including the identifying indicia. The body is connected by a neck portion, which is usually in right angular relation to the body portion, to an anchoring head. This anchoring head extends upwardly and downwardly therefrom. The anchoring head will not readily pull out due to relatively rigid construction thereof. The neck of the tag, rather than the anchoring head, flexes during insertion into the ear.

4 Claims, 9 Drawing Figures

MARKING TAG

Matter enclosed in heavy brackets [ ] appears in the original patent but forms no part of this reissue specification; matter printed in italics indicates the additions made by reissue.

This is a continuation-in-part of my previous application, Ser. No. 216,489, filed Jan. 10, 1972, for "MARKING TAGS" now abandoned.

This invention relates to an improvement in marking tags and deals particularly with an identifying member which may be inserted through the ear of cattle or the like in order to identify them.

BACKGROUND OF THE INVENTION

For a considerable number of years, the desirability of identifying cattle has been recognized. For many years cattle have been branded to show ownership. More recently the use of markings of one type or another for the purpose of identifying the individual animals has become more important. In some instances, this has been done by tattooing the ear of the animal with individual numbers or other indicia so that each animal may be recognized from the others. Individual metal tags have for many years been clipped to the ears or otherwise anchored thereto. Obviously, if such tags get caught in wire fencing, underbrush or the like, the ear may be seriously damaged and the identification may be lost or destroyed.

In recent years the use of identifying tags made of resilient plastic has become quite common. These tags have the advantage of being legible from a greater distance than tags of most sorts, cause less damage to the animal, and are somewhat less likely to be accidentally removed than the metal tags previously used. One such tag which has been produced in some volume comprises an identifying panel which is marked to provide the identification, the upper portion of this panel being tapered for connection with a relatively narrow neck. This neck connects the identification panel with an anchoring head. The anchoring head is usually of generally triangular form having shoulders which extend laterally from opposite sides of the neck. The identification panel, the relatively narrow neck portion, and the anchoring head are usually of uniform thickness. To insert the tag, the anchoring head is rolled into tubular form of a diameter usually substantially equal to the width of the neck portion. This anchoring head is then inserted through a slit in the ear of the animal. After insertion, the anchoring head is allowed to unroll, leaving the neck extending through the slit in the ear and held from disengagement from the slit by the relatively wide identification panel and the relatively wide laterally extending shoulders on the anchoring head.

To facilitate the insertion, a hollow tubular tool or instrument is provided having a pointed and flattened end which is sharpened for insertion through the ear. The tubular body is designed to accommodate the tubularly rolled anchoring head. The tool is forced completely through the ear and then withdrawn from the anchoring head to permit this head to unroll. While it is possible to insert the tag without this tool or instrument, the operation is somewhat difficult due to the fact that the head must be held in rolled condition during insertion. Probabaly the greatest objection to this type of tag is the difficulty experienced by the rancher in rolling up the anchoring head for insertion into the tubular instrument. The head cannot be very flexible, as this facilitates accidental disengagement. At the same time, the less flexible the head is made, the greater is the difficulty in rolling it up. As constructed, the head is quite stiff to insure retention in the ear. Accordingly in actual practice it is quite difficult to roll it up small enough for insertion into the instrument.

SUMMARY OF THE INVENTION

I have found that a tag of improved character may be produced by making a tag with an anchoring head which is thicker and more rigid than the neck portion of the tag. This anchoring head is preferably no wider than the neck and projects on opposite sides of the surfaces of the neck rather than from opposite lateral side edges thereof. This anchoring head is not flexed or rolled during the insertion process. The relatively rigid anchoring head is merely folded in parallel relation to the relatively resilient neck. The anchoring head may be inserted through a slit in the ear of the animal in an end-wide direction. After insertion, the neck of the tag flexes into its normal position and the anchoring head extends upwardly and downwardly above and below the slit rather than laterally therefrom as in the past.

This arrangement has numerous advantages over previous tag construction. If tags are being inserted by hand without the use of an insertion tool, the slit may vary in length. In the past, the shoulders of the anchoring head are parallel to the slit, and the tag may be accidentally pulled loose if the slit is excessively long as from natural growth of young livestock. Furthermore, by having the anchoring portion of the head at right angles to the direction of the slit, the anchoring head will not irritate the surface of the ear adjoining the slit. Due to the fact that the anchoring head need not be held in a rolled up form during insertion, the present tag may be much more easily inserted without an insertion tool than in the past. Furthermore, within reasonable limits, the thickness of the anchoring head has no effect on the ease of insertion.

These and other objects and novel features of the present invention will be more clearly and fully set forth in the following specification and claims.

DESCRIPTION OF THE PREFERRED EMBODIMENT

Figure 3:
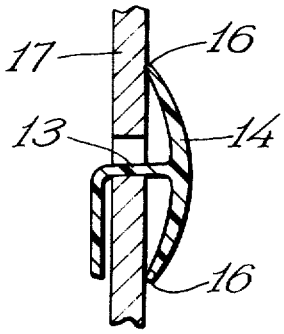
FIG. 3 is an enlarged sectional view showing the anchoring means in place in the ear.
Figure 5:
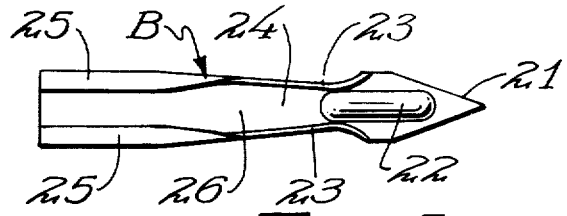
FIG. 5 is a plan view of the insertion tool.
Figure 4:
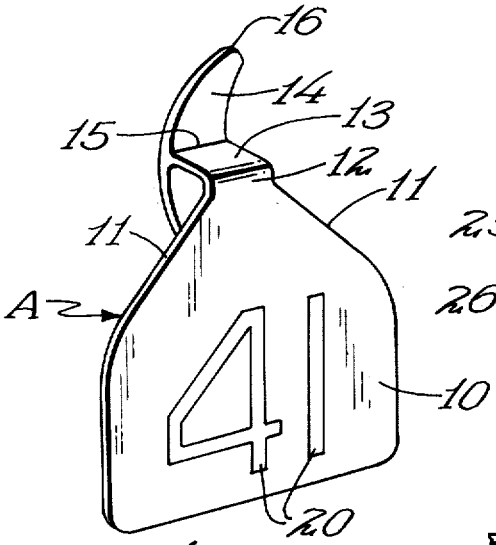
FIG. 4 is a perspective view of the tag.
Figure 6:
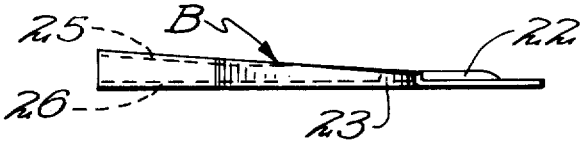
FIG. 6 is a side elevational view of the tool shown in FIG. 5.
Figure 9:
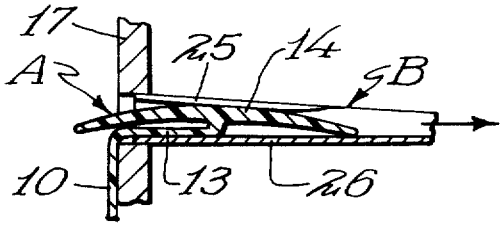
FIG. 9 is a diagrammatic view showing the insertion tool as it is being removed from the identification tag.

As is indicated in FIG. 4 of the drawings, the tag is indicated in general by the letter A and includes a body portion or display panel 10 which is connected by converging upper end portions 11 to a neck 12 of relatively narrow width. In the particular arrangement illustrated, the neck portion 12 is connected to a neck section 13 which is of generally similar width to the short neck portion 12 which is coplanar with the body portion 10. The neck 13 is connected to an anchoring head 14 along a generally right angular line of connection 15. The head 14 is preferably slightly concave on the surface which is connected to the neck 13 and correspondingly convex on its outer surface. As is indicated in FIGS. 3 and 9 of the drawings, the anchoring head 14 is somewhat thicker at its point of connection with the neck section 13 so that this anchoring head is somewhat more rigid than the remainder of the tag body. The body is formed of a resilient plastic or other rubberlike material [,] and it is preferable that the anchoring head be somewhat more rigid than the neck 13 or the body portion 10. As is indicated, the head is generally ovular in shape and includes rounded ends 16 which will bear against the ear of the animal when inserted, but will not cause any abrasion thereto.

Figure 1:
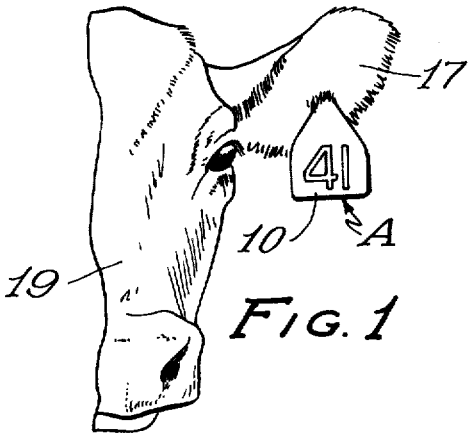
FIG. 1 is a view showing the identification tag in the ear of an animal.

The body portion 10 is shown in FIG. 1 of the drawings as depending from the ear 17 of the animal 19. The body 10 is provided with indicia such as 20 which may be in the form of a number, letter, or other symbol to designate the ownership as well as the individual identity of the animal. In view of the fact that the tag is quite large, the identification may be made from somewhat of a distance from the animal.

While the tag may be manually inserted through a slit in the ear of the animal, an insertion tool which is indicated in general by the letter B may also be employed to simplify the process. The insertion tool B is provided with a sharply pointed end 21 which is strengthened to some extent by a longitudinally extending central rib 22. Rearwardly of the head 21, the side edges of the tool are bent upwardly as indicated at 23 to form a generally channel shaped or U-shaped form which serves to cut a similarly shaped slit in the ear of the animal. Rearwardly of the channel shaped portion 24, the side flanges are folded inwardly as indicated at 25, the flanges 25 extending substantially parallel to the base 26 of the tool. The flanges 25 are designed to retain the anchoring head of the tag during its insertion through the ear of the animal.

Figure 2:
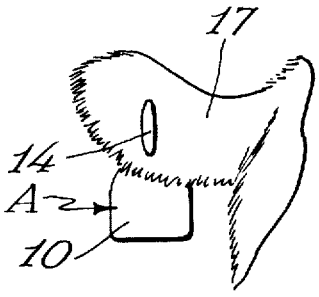
FIG. 2 is a rear elevational view of the animal's ear with the tag inserted showing the rear side of the tag.
Figure 7:
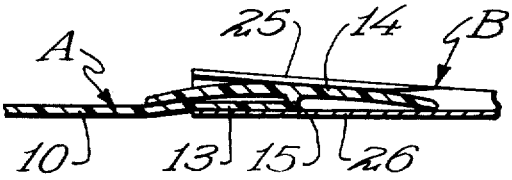
FIG. 7 is a longitudinal sectional view of a portion of the tool with the anchoring end of the tag in place therein.
Figure 8:
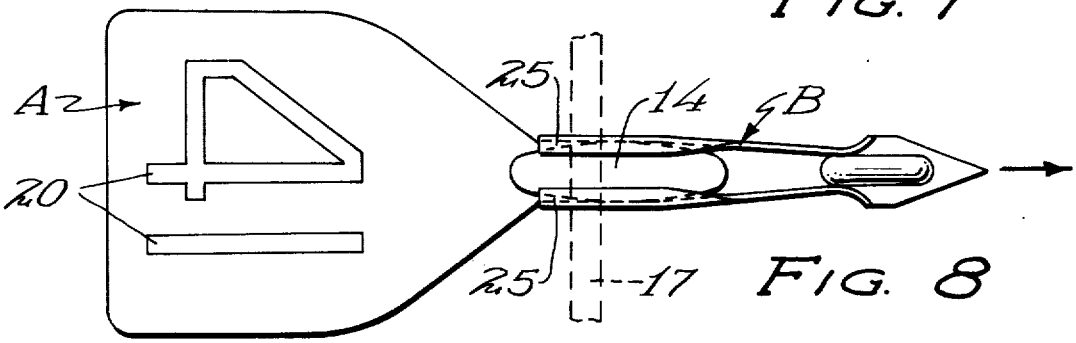
FIG. 8 is a plan view of the insertion tool and tag as it is inserted into the ear of the animal.

FIG. 7 of the drawings indicates the manner in which the anchoring head 14 is inserted into the tool. The generally oval shaped head is merely inserted between the flanges 25 and the base portion 26 of the tool. This is accomplished by bending the neck portion 13 along or adjoining the line 15 which is the line of connection with the head. The anchoring head itself is not deformed or changed in shape to any material extent, the relatively rigid head normally maintaining its form during the insertion operation. When the anchoring head of the tag is inserted into the instrument B as indicated in FIG. 7 of the drawings, the pointed end 21 of the instrument is inserted through the ear of the animal until the anchoring head is virtually through the ear as indicated in FIG. 9 of the drawings. Further movement of the tag through the ear is impeded by the tapered shoulders 11 of the tag. The insertion tool B is removed from the anchoring head of the tag, and the neck 13 is allowed to assume its normal position as indicated in FIG. 4, the anchoring head extending along one side of the ear, while the body 10 of the tag extends along the opposite side thereof. The tag then assumes the position indicated in FIG. 1 of the drawings, and the anchoring head assumes the position shown in FIGS. 2 and 3. The tag is then supported from the ear in a position where it may be readily seen for identification of the animal.

In accordance with the Patent Office statutes, I have described the principles of construction and operation of my improvement in Marking Tags, and while I have endeavored to set forth the best embodiment thereof, I desire to have it understood that changes may be made within the scope of the following claims without departing from the spirit of my invention.

I claim:

1. A unitary livestock identification ear tag which can be readily folded from a normal configuration to a compact configuration for insertion into an animal's ear, following which it resiliently returns to said normal configuration for effective retention into place, said tag comprising an elongated flat body portion adapted to receive identification indicia, a neck section resiliently hinged along one of its edges to an edge of said body portion with said one edge defining a first transverse junction, said neck section extending substantially perpendicular to said body portion in said normal configuration, said neck section being thin and substantially flat in cross-section and being of a length sufficient, but not greatly exceeding, the length necessary to accommodate the thickness of an animal's ear, an elongated anchoring head substantially concave-convex from end to end and substantially equal in width to said neck section resiliently hinged intermediate the opposed ends of said anchoring head to the other edge of said neck section along a second transverse junction substantially parallel to said first junction, said anchoring head extending only in two directions from said second junction substantially normal to said neck section and substantially parallel to said body portion in said normal configuration, the convex side of said head having a smaller radius of curvature than the opposite surface, whereby the thickness of said anchoring head is greater at said second junction than at the ends of said head, said anchoring head having opposed ends which are rounded sufficiently to engage an animal's ear to prevent unnecessary abuse of the ear during the use of the tag, said neck section being bendable along said first and second transverse junctions to position said neck into substantially coplanar relation to said body portion, and to position one end of said anchoring head substantially parallel to and substantially contacting said neck section and the other end of said anchoring head outwardly beyond said neck section with said other end of said anchoring head substantially in the plane of said neck section, whereby said neck section and said anchoring head are folded into a compact configuration for insertion through a slit in an animal's ear.

*2. A unitary livestock identification ear tag which can be readily folded from a normal configuration to a compact configuration for insertion into an animal's ear, following which it resiliently returns to said normal configuration for effective retention into place, said tag comprising an elongated flat body portion adapted to receive identification indicia, a neck section resiliently attached at one of its edges to said body portion along a first transverse junction, said neck section extending substantially perpendicular to said body portion in said normal configuration, said neck section being thin and substantially flat in cross-section and being of a length sufficient, but not greatly exceeding, the length necessary to accommodate the thickness of an animal's ear, an elongated anchoring head substantially*

*equal in width to said neck section resiliently attached intermediate the ends of said anchoring head to the opposite edge of said neck section along a second transverse junction substantially parallel to said first junction, said anchoring head extending lengthwise only from said second junction substantially normal to said neck section and substantially parallel to said body portion in said normal configuration, said neck section being bendable along said first and second transverse junctions to position said neck into substantially coplanar relation to said body portion and to position one end of said anchoring head substantially parallel to and substantially contacting said neck section and the other end of said anchoring head outwardly beyond said neck section with said other end of said anchoring head substantially in the plane of said neck section, whereby said anchoring head is folded into a compact configuration with said neck section for insertion through a slit in an animal's ear and returns to normal configuration after insertion into the ear.*

*3. The animal identification ear tag as described in claim 2 wherein the outer surface of the anchoring head is convex with respect to its inner surface.*

*4. The animal identification ear tag as described in claim 2 wherein the anchoring head is thicker at said second junction than at its ends.*

* * * * *

Disclaimer

Re. No. 29,536.—*Donald David Fearing*, Mahtomedi, Minn. MARKING TAG. Patent dated Feb. 14, 1978. Disclaimer filed Mar. 28, 1980, by the inventor.

Hereby disclaims the term of said patent subsequent to Dec. 10, 1987.

[*Official Gazette, May 27, 1980.*]